United States Patent [19]

Ojima

[11] Patent Number: 4,981,460
[45] Date of Patent: Jan. 1, 1991

[54] TENSIONER
[75] Inventor: Juji Ojima, Aikawa, Japan
[73] Assignee: NHK Spring Co., Ltd., Yokohama, Japan
[21] Appl. No.: 448,813
[22] Filed: Dec. 12, 1989
[51] Int. Cl.$^5$ .............................................. F16H 7/08
[52] U.S. Cl. ................... 474/111; 210/500.21; 474/138
[58] Field of Search ............... 474/109, 110, 111, 136, 474/138; 427/245, 246; 210/500.21, 500.34

[56] References Cited
U.S. PATENT DOCUMENTS

| | | | |
|---|---|---|---|
| 2,826,509 | 3/1958 | Sarbach | 427/245 |
| 4,093,515 | 6/1978 | Kolobow | 210/500.21 |
| 4,459,210 | 7/1984 | Murakami et al. | 210/500.35 |
| 4,743,224 | 5/1988 | Yoshikawa et al. | 474/101 |

Primary Examiner—Thuy M. Bui
Attorney, Agent, or Firm—Fleit, Jacobson, Cohn, Price, Holman & Stern

[57] ABSTRACT

In a tensioner, in which a rotary body and an urged body are attached within a casing in a screwed portion and the urged body advances in an axial direction by the rotation of the rotary body with a spring force, a portion where an inner space of the casing and its outside interconnects is isolated with a selective transmission material which prevents oil penetration but allows air transmission.

6 Claims, 1 Drawing Sheet

TENSIONER

BACKGROUND OF THE INVENTION

This invention relates to a tensioner which provides a fixed tension to a chain or a timing belt which drives a cam shaft of an engine of a car. The tensioner is generally used as a chain or a belt tensioner to an engine. The tensioner operates to push the chain or the belt in a certain direction, directly or indirectly, so as to maintain a fixed tension when the chain or the belt is extended and slackens by friction.

Such a tensioner is adapted to be inserted into a casing by screwing a rotary body and an urged body to energize the rotation of the rotary body with a spring force and change the rotation force of this rotary body to a propelling force of the urged body to advance the urged body from the casing. The top end of the urged body always urges the chain or the like, thereby maintaining a fixed tension.

Further, the top end of this tensioner is covered with an elastic boot and an opening hole is sealed with a seal bolt formed at the base side to form a sealing construction, thereby maintaining a lubricant oil therein.

Further, in the traditional tensioner, an air escaping hole is formed at a suitable location in order to adjust a pressure change due to a change of inner content of the casing caused by the advancement and retraction of the urged body.

However, in the traditional tensioner having the above construction, lubricant oil leakages from an air escaping hole during storage causes a shortage of lubricant oil at the time of the use.

Further, even if during the use of the tensioner, the lubricant oil leakages from the air escaping hole by a breathing phenomenon due to the vibration added to the tensioner, a belt is soiled which can cause slippage between a pulley and the belt and a suitable driving of the belt is not obtained.

Furthermore, the air escaping hole must be provided at a position where it does not contact with the lubricant oil. The traditional tensioner has various problems such as a limitation of bored position and the like.

BRIEF DESCRIPTION OF THE INVENTION

This invention overcomes the disadvantages of the above conditions. The object is to provide a tensioner which has no interconnected portion between the inner and outer portions of the tensioner to prevent leakage of the inner lubricant oil and is possible to provide a smooth operation which does not cause an increase of inner pressure in spite of a change of the inner pressure due to the advancement or retraction of the urged body.

In order to achieve the above object, the rotary body and the urged body are attached in a casing in a screwed state. In the tensioner, the urged body advances in an axial direction by rotating the rotary body with a spring force, the portion which interconnects the space in the casing and the outer portion is characterized by being isolated by a ventilation material which prevents oil penetration.

In this case, for instance, an inserting hole of a stopper pin or the like locks a boot which itself covers a top end portion of the casing located between the urged body and the boot, a sealing portion with a seal bolt at the base side of the casing, an air escaping hole, and the rotation of the rotary body.

Further, a selective transmission material prevents oil penetration, but transmits air. For instance, in this case, porous substances having micro-particles or mesh construction bodies of fluoro-resin, anti-oil rubber and the like are used.

Further, the on by selective transmission material member, for instance, to form the boot itself with the above material or to close the interconnected hole of the inner and outer portions of the air escaping hole, the inserting hole of the stopper pin or the like is made with the above materials.

DETAILED DESCRIPTION OF THE INVENTION

Figure 1:
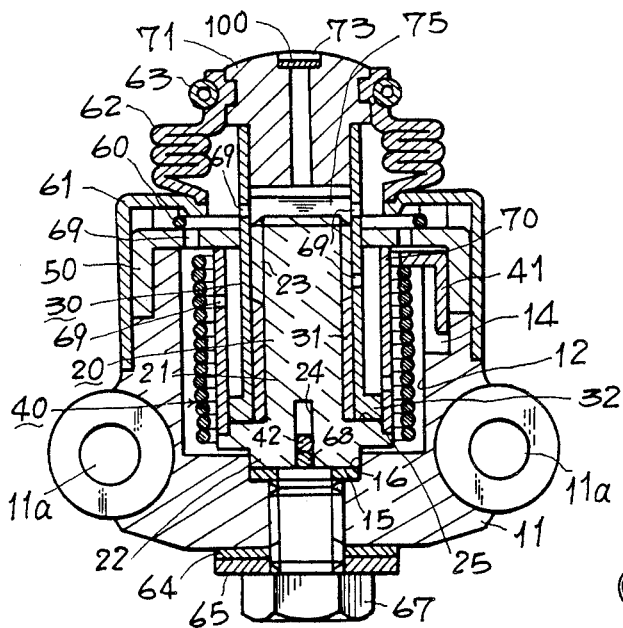
FIG. 1 and FIG. 2 are respectively a cross-sectional view and a plane view of an example of this invention.

Now referring to accompanying drawings, this invention will be described as follows;

FIG. 1 is a cross-sectional view of an example which applies this invention to a belt tensioner.

Figure 2:
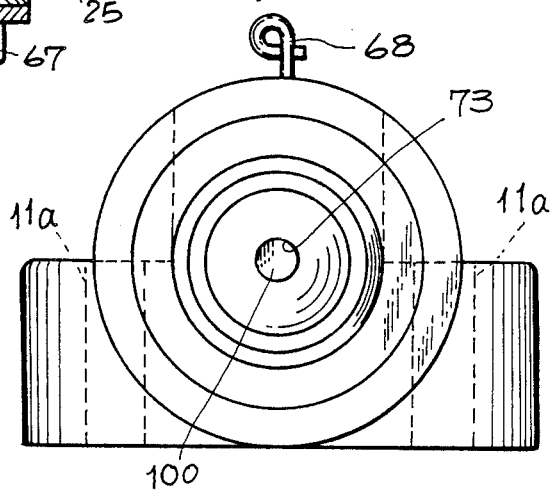

FIG. 2 is a plan drawing thereof. In these drawings, a hollow portion 12 is formed in the axial direction of the casing 11 having an attachment hole 11a for the engine or the like formed at the outside thereof, said hollow portion 12 incorporating the rotary body 20, urged body 30 and coil spring 40 therein. The axial portion 21 of the rotary body 20 is screwed within the urged body 30 and the fixed portion 22 of the base side (lower side) is inserted into the dent portion 16 formed at the base end portion of the hollow portion 12 together with washer 15 to be supported rotatably. In this case, the axial portion 21 of the rotary body 20 is provided with a screw portion 23 through its whole outer circumference. On the other hand, in the urged body 30 the screw portion 31 screwed with the male screw portion 23 is formed in a part of the inner circumferential surface. At the top end portion (upper end portion) of the casing 11, the bearing member 50 is provided. The bearing hole is opened at the center of the bearing member 50 and an extended portion extending from the bearing hole toward outside is bent to the outside to be inserted into an engaged groove formed at the top end portion of the casing 11 at fixed intervals. By this, the bearing member 50 is fixed to the casing 11 without any rotation. Further, the bearing hole is bored to be a noncircular form such as approximately a small ellipse consisting of two parallel lines and an arc line which combines both ends of the two parallel lines. The urged body 30, is inserted into this bearing hole and restrained against rotation. For this purpose, the outer shape of the urged body is formed to be a corresponding shape to the bearing hole of the bearing member 50. Since the almost whole length of the urged body 30 is insertable through the bearing hole, the stroke length of the urged body 30 is secured sufficiently. A stopper flange 32 having a large diameter is formed at the base portion of the urged body 30, said stopper flange 32 abuts against the bearing member 50 to stop the advancement of the urged body 30 whereby the pulling out of the urged body is adapted to be stopped.

The coil portion of the coil spring 40 is outwardly inserted into the urged body, one end portion 41 thereof being inserted into a long groove 14 formed on the hollow portion 12 of the casing 11.

On the other hand, another end 42 of the coil spring 40 is inserted into the slit 24 formed at the fixed portion 22 of the rotary body 20. By this, the rotary body 20 is allowed to rotate by the coil spring 40. Further, this rotation drives the urged body 30 so as to advance it in a straight direction. In such a construction, the rotary body 20 is inserted into the urged body 30 which inserted into the coil spring 40, the length of the device in the axial direction, or the length in the tension adjustment direction is shortened, thereby being able to minimize the length of the device.

In addition to the above construction, the cap 71 is inserted into the top end portion of the urged body, the top end surface thereof being adapted to abut against the belt directly or indirectly.

In this case, the attaching of the cap 71 is performed by inserting it into the top end portion of the urged body 30 and then forcibly inserting a spring pin into the urged body 30 and the cap 71 respectively to stop the pulling out thereof. Further, the top end portion of the elastic boot 62 is fixed to the cap 71 by inserting a garter spring 63 and the base portion of the boot 62 is adhered to a cover 61 inserted into the top end portion of the casing 11, whereby the top end portion of the casing is covered as shelter from the outside.

Further, in order to secure the lubrication of the lubricant oil, oil holes are provide suitably in the urged body 30, the bearing member 50 and a collar 70 described hereafter. In this example, the cap 71 extends upwardly and is provided with an air escaping hole 73 which interconnects to the outside. Further a selective transmission material 100 is secured to the air escaping hole 73 so as to close the hole. Since this selective transmission material 100 is a ventilation material which prevents oil penetration, leakage of the lubricant oil from the air escaping hole 73 is prevented whereby the ventilation of the air from the inner and the outer portions of the casing is secured through this air escaping hole. By this, the inner pressures of the boot 62 and the casing do not vary according to the changes of the inner volumes thereof and the lubrication of the lubricant oil is performed smoothly.

Further, in this example a cylindrical collar 70 is inserted between the urged body 30 and the coil portion of the coil spring 40. Although the collar is not always necessary to a substantial function of the tensioner this installation prevents the contact of the coil spring with the urged body 30 and the intrusion thereinto by bending of the coil portion of the coil spring 40, which enables the smooth sliding of the urged body 30. The base portion of such collar 70 is inserted into a step portion 25 formed at the outer circumference of the fixed portion 22 of the rotary body 20 to support it. The numeral 60 is a snap ring engaged to the top end surface of the casing 11, said snap ring preventing the coming off of the bearing member 50. Further, a seal bolt 67 is screwed with the base portion of the casing 11 via a sealing sheet 64 and a washer 65 whereby the base portion side is sealed. Furthermore, 68 is a stopper pin inserted from the outside of the casing 11 so as to be able to be inserted or to be pulled out, the top end of the stopper pin being adapted to reside within the slit 24 of the rotary body 20. Accordingly, the rotary of the rotation body 20 is locked in a state where the stopper pin 68 is inserted.

Figure 3:
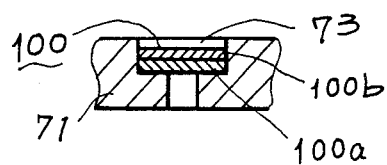
FIG. 3 is a cross-sectional view in a material portion of another example.

FIG. 3 shows another example of this invention, the selective transmission material 100 is constituted by laminating a ventilation material 100a which prevents oil penetration and a ventilation material 100b which prevents a water penetration. By this, the leakage of the lubricant oil from the inside and the invasion of water from the outside are prevented thereby being able to secure good ventilation.

Figure 4:
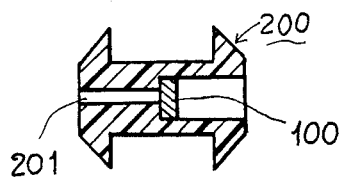
FIG. 4 is a cross-sectional view of a sealing member in a further example.

FIG. 4 shows further another example of this invention. The sealing member 200 shown in FIG. 4 seals the base end portion of the casing 11 in place of the seal bolt 67. The sealing member 200 is made of an elastic material. An opening of the base end portion of the casing 11 is sealed due to the elasticity thereof.

A penetrated hole 201 having a step difference is bored at approximately an intermediate portion of the sealing member 200. The selective transmission material 100 is fixed at this step difference portion to close the penetrated hole 200.

In this example, when the tensioner is used in a downward state, the sealing member 200 inserted into the base portion of the casing 11 serves as an air escaping hole 201.

This invention is not limited to the examples described above, but the following various kinds of changes may be considered within the scope of the claims without departing from the spirit of the invention.

It is not only to close the air escaping hole with a selective transmission material 100, but also possible to form the boot 62 itself with a selective transmission material 100 without mounting the air escaping hole 100 or covering the sealing position of the seal bolt 67 with a selective transmission material 100.

Further, the inserting hole of the stopper pin 68 may be closed with a selective transmission material. In this case, the above portion may be used as the air escaping hole after removing the stopper pin 68.

Furthermore, when the strength is weak in use of selective transmission material 100, the reinforcement may be obtained by interposing a wire net or a punching metal.

As described above, since the tensioner of this invention isolates the portion where the inner space of the casing and the outerside thereof is interconnected with a ventilation material which prevents oil penetration, leakage of lubricant oil from the outerside is prevented. Further, in spite of the change of the inner volume, a change of inner pressure does not occur. Therefore, a reliable operation of the tensioner can be obtained secured.

What I claim is:

1. A tensioner comprising:
   a casing,
   a rotary body and an urged body provided in the casing in a screwed state, said urged body advancing in an axial direction by rotating the rotary body by a spring force,
   means for isolating an interior of the casing from an exterior thereof by interconnection with a ventilation material which prevents oil penetration and allows air communication.

2. A tensioner according to claim 1, wherein the ventilation material is a laminated body consisting of a material which prevents oil penetration and another material which prevents water penetration.

3. A tensioner according to claim 1, wherein a hole for air escape is bored in a sealing member which seals a base end portion of the casing, said hole being isolated with the ventilation material.

4. A tensioner according to claim 1, wherein a boot covers a top end of the casing is attached between the urged body and the casing and is formed with the ventilation material.

5. A tensioner according to claim 1, wherein an air hole is bored in a top end portion of the urged body, said air hole being isolated by the ventilation material.

6. A tensioner according to claim 1, wherein an inserting hole of a stopper pin which locks the rotation of the rotary body is located in the casing, said inserting hole being isolated by the ventilation material.

* * * * *